United States Patent [19]
Weng et al.

[11] Patent Number: 6,117,962
[45] Date of Patent: *Sep. 12, 2000

[54] VINYL-CONTAINING STEREOSPECIFIC POLYPROPYLENE MACROMERS

[75] Inventors: Weiqing Weng, Houston; Armen Dekmezian; Eric J. Markel, both of Kingwood; Avinash Gadkari; David L. Peters, both of Houston, all of Tex.

[73] Assignee: Exxon Chemical Patents Inc., Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 09/020,101

[22] Filed: Feb. 6, 1998

(Under 37 CFR 1.47)

Related U.S. Application Data

[60] Provisional application No. 60/067,783, Dec. 10, 1997.

[51] Int. Cl.[7] .................................................. C08F 110/06
[52] U.S. Cl. ........................... 526/351; 526/127; 526/160
[58] Field of Search .................................... 526/351, 127, 526/160

[56] References Cited

U.S. PATENT DOCUMENTS

| | | | |
|---|---|---|---|
| 4,530,914 | 7/1985 | Ewen et al. | 502/113 |
| 4,542,199 | 9/1985 | Kaminsky et al. | 526/160 |
| 4,665,208 | 5/1987 | Welborn, Jr. et al. | 556/179 |

(List continued on next page.)

FOREIGN PATENT DOCUMENTS

| | | |
|---|---|---|
| 2118711 | 3/1993 | Canada. |
| 0 277 003 A1 | 8/1988 | European Pat. Off.. |
| 0 277 004 A1 | 8/1988 | European Pat. Off.. |
| 0 279 586 B1 | 8/1988 | European Pat. Off.. |
| 0 279 863 A1 | 8/1988 | European Pat. Off.. |
| 0 354 893 A2 | 2/1990 | European Pat. Off.. |
| 0 426 637 A2 | 5/1991 | European Pat. Off.. |
| 0 476 148 A1 | 3/1992 | European Pat. Off.. |
| 0 520 732 A1 | 6/1992 | European Pat. Off.. |
| 0 495 375 A2 | 7/1992 | European Pat. Off.. |
| 0 500 944 A1 | 9/1992 | European Pat. Off.. |
| 0 561 476 A1 | 9/1993 | European Pat. Off.. |
| 0 570 982 A1 | 11/1993 | European Pat. Off.. |
| 0 573 403 A2 | 12/1993 | European Pat. Off.. |
| 0 577 581 A2 | 1/1994 | European Pat. Off.. |
| 0 578 838 A1 | 1/1994 | European Pat. Off.. |
| 0 594 218 A1 | 4/1994 | European Pat. Off.. |
| 0 667 359 A1 | 8/1995 | European Pat. Off.. |
| 41 30 229 A1 | 3/1993 | Germany. |
| WO 91/09882 | 7/1991 | WIPO. |
| WO 92/00333 | 1/1992 | WIPO. |
| WO 92/10066 | 6/1992 | WIPO. |
| WO 93/19103 | 9/1993 | WIPO. |
| WO 94/03506 | 2/1994 | WIPO. |
| WO 94/07928 | 4/1994 | WIPO. |
| WO 94/10180 | 5/1994 | WIPO. |
| WO 94/28034 | 12/1994 | WIPO. |
| WO 95/33779 | 12/1995 | WIPO. |
| WO 96/00243 | 1/1996 | WIPO. |
| WO 96/00245 | 1/1996 | WIPO. |
| WO 96/04319 | 2/1996 | WIPO. |
| WO 96/33227 | 10/1996 | WIPO. |
| WO 98/34971 | 8/1998 | WIPO. |

OTHER PUBLICATIONS

*Experimental Methods in Catalyst Research*, vol. 1, Academic Press, 1968, pp. 67–96.

Journal of Organometallic Chemistry, 369, 359–370 (1989).

Olefin Polymerization at Bis(pentamethylcyclopentadienyl)zirconium and hafnium centers: Chain–Transfer Mechanisms, Resconi, et al., J. Am. Chem. Soc., 1992, 114, 1025–1032.

"ansa–Zirconocene Polymerization Catalysts with Annelated Ring Ligands–Effects on Catalytic Activity and Polymer Chain Lengths", H. Brinzinger, et al., Organometallics 1994, 13, 964–970.

"The Influence of Aromatic Substituents on the Polymerization of Behavior of Bridged Zirconocene Catalysts", Spaleck, W., et al., Organometallics, 1994, 13, 954–963.

Copolymerization of poly(propylene) macromonomer and ethylene with metallocene catalysts, Shino, et al., Macromol. Symp. 97, 161–170 (1995).

Cationic Zirconocene Olefin Polymerization Catalysts Based on the Organo–Lewis Acid Tris(pentaflurorphenyl)borane. A Synthetic, Structural, Solution Dynamic, and Polymerizatioon Catalytic Study, Yang, et al., J. Am. Chem. Soc., 1994, 116, 10015–10031.

Bivariate chain length and long chain branching distribution for copolymerization of olefins and polyolefin chains containing terminal double–bonds, Macromol. Theory Simul. 5, 547–572 (1996).

Semicrystalline Polyolefins—Narrow MWD and Long Chain Branching: Best of Both Worlds, Antec, pp. 2234–2237, 1996.

Cationic Metallocene Polymerization Catalysts Based on Tetrakis (pentafluorophenyl)borate and Its Derivatives. Probing the Limits of Anion "Noncoordination" via a Synthetic, Solution Dynamic, Structural, and Catalytic Olefin Polymerization Study, Jia, et al., Organometallics, 1997, 16, 842–857.

*Primary Examiner*—David W. Wu
*Assistant Examiner*—Caixia Lu
*Attorney, Agent, or Firm*—Brent M. Peebles; W. G. Muller

[57] ABSTRACT

Stereospecific polypropylene macromers having a high percentage of vinyl terminal bonds and a method for preparing them are provided. The stereospecific polypropylene macromers have number average molecular weights ($M_n$) of about 2,000 Daltons to about 50,000 Daltons, and the total number of vinyl groups per 1000 carbon atoms is greater than or equal to $7000 \div M_n$. The method for preparing the macromers involves:

a) contacting, in solution, at a temperature from about 90° C. to about 120° C., two or more propylene monomers with a catalyst composition comprising a chiral, stereorigid transition metal catalyst compound; and b) recovering stereospecific polypropylene chains having number average molecular weights of about 2,000 Daltons to about 50,000 Daltons and significant vinyl unsaturation.

20 Claims, No Drawings

U.S. PATENT DOCUMENTS

| | | | |
|---|---|---|---|
| 4,701,432 | 10/1987 | Welborn, Jr. | 502/113 |
| 4,769,910 | 9/1988 | Noon | 30/91.2 |
| 4,808,561 | 2/1989 | Welborn, Jr. | 502/104 |
| 4,871,705 | 10/1989 | Hoel | 502/117 |
| 4,874,734 | 10/1989 | Kioka et al. | 502/104 |
| 4,892,851 | 1/1990 | Ewen et al. | 502/104 |
| 4,908,463 | 3/1990 | Bottelberghe | 556/179 |
| 4,921,825 | 5/1990 | Kioka et al. | 502/104 |
| 4,923,833 | 5/1990 | Kioka et al. | 502/9 |
| 4,924,018 | 5/1990 | Bottelberghe | 556/179 |
| 4,933,403 | 6/1990 | Kaminsky et al. | 526/160 |
| 4,937,299 | 6/1990 | Ewen et al. | 526/119 |
| 4,952,540 | 8/1990 | Kioka et al. | 502/9 |
| 4,968,827 | 11/1990 | Davis | 556/179 |
| 5,017,714 | 5/1991 | Welborn, Jr. | 556/12 |
| 5,026,798 | 6/1991 | Canich | 526/127 |
| 5,057,475 | 10/1991 | Canich et al. | 502/104 |
| 5,091,352 | 2/1992 | Kioka et al. | 502/103 |
| 5,103,031 | 4/1992 | Smith, Jr. | 556/179 |
| 5,120,867 | 6/1992 | Welborn, Jr. | 556/12 |
| 5,132,381 | 7/1992 | Winter et al. | 526/160 |
| 5,155,080 | 10/1992 | Elder et al. | 502/152 |
| 5,157,137 | 10/1992 | Sangokoya | 556/179 |
| 5,204,419 | 4/1993 | Tsutsui et al. | 526/153 |
| 5,206,199 | 4/1993 | Kioka et al. | 502/117 |
| 5,235,081 | 8/1993 | Sangokoya | 556/179 |
| 5,240,894 | 8/1993 | Burkhardt et al. | 502/108 |
| 5,248,801 | 9/1993 | Sangokoya | 556/179 |
| 5,278,119 | 1/1994 | Turner et al. | 502/155 |
| 5,278,264 | 1/1994 | Spaleck et al. | 526/127 |
| 5,296,434 | 3/1994 | Karl et al. | 502/117 |
| 5,304,614 | 4/1994 | Winter et al. | 526/127 |
| 5,308,815 | 5/1994 | Sangokoya | 502/104 |
| 5,324,800 | 6/1994 | Welborn, Jr. et al. | 526/160 |
| 5,329,032 | 7/1994 | Tran et al. | 556/179 |
| 5,350,723 | 9/1994 | Neithamer et al. | 502/104 |
| 5,391,790 | 2/1995 | Rohrmann et al. | 556/28 |
| 5,688,734 | 11/1997 | Speca et al. | |

VINYL-CONTAINING STEREOSPECIFIC POLYPROPYLENE MACROMERS

This application is based on U.S. provisional application 60/067,783, filed Dec. 10, 1997.

FIELD OF THE INVENTION

The present invention relates to vinyl-containing stereospecific polypropylene macromers and a method for the preparation of vinyl-containing polypropylene macromers utilizing chiral, stereorigid transition metal catalyst compounds at higher temperatures.

BACKGROUND OF THE INVENTION

Vinyl-terminated polymers, including for the purposes of this application oligomers, homopolymers and copolymers synthesized from two or more monomers, are known to be useful for post-polymerization (or post-oligomerization) reactions due to the available ethylenic unsaturation in one polymer, at one chain end, or both. Such reactions include addition reactions, such as those used in grafting other ethylenically unsaturated moieties, and further insertion polymerization where the vinyl-terminated polymers are copolymerized with other monomers such as α-olefins and/ or other insertion polymerizable monomers. In this latter instance the vinyl-terminated polymers are often called macromonomers, or macromers.

Early work with metallocene transition metal catalyst compounds activated with alkylalumoxanes such as methylalumoxane led to observations that their use in olefin polymerization gave rise to unsaturated end-groups in a greater percentage of polymer produced than had typically been true of insertion polymerization using traditional, pre-metallocene Ziegler-Natta catalysts. See EP-A-0 129 638 and its U.S. Pat. No. 5,324,800. Later work by Resconi et al., reported in *Olefin Polymerization at Bis (pentamethylcyclopentadienyl)zirconium and —hafnium centers: Chain-Transfer Mechanisms, J. Am. Chem. Soc.*, 1992, 114, 1025–1032, yielded the observations that the use of bis(pentamethylcyclopentadienyl) zirconcene or hafnocene in propylene oligomerization favors β-methyl elimination over the more commonly expected β-hydride elimination as the means for chain transfer, or polymer chain termination. This was based on observations that the ratio of vinyl-end groups to vinylidene-end groups was in the range of 92 to 8 for the zirconocene and 98 to 2 for the hafnocene. The polymerization of propylene in this article yielded atactic propylene oligomers and low molecular weight polymers. Similar results have been achieved by Shiono, et al., reported in *Copolymerization of poly(propylene) macromonomer and ethylene with metallocene catalysts, Macromol. Symp.* 97, 161–170 (1995), and Yang, et al., reported in *Cationic Zirconocene Olefin Polymerization Catalysts Based on the Organo-Lewis Acid Tris(pentafluorophenyl) borane. A Synthetic, Structural, Solution Dynamic, and Polymerization Catalytic Study, J. Am. Chem. Soc.*, 1994, 116, 10015–10031.

In addition to these observations, WO 94/07930 addresses advantages of including long chain branches in polyethylene from incorporating vinyl-terminated macromers into polyethylene chains where the macromers have critical molecular weights greater than 3,800, or, in other words contain 250 or more carbon atoms. Conditions said to favor the formation of vinyl terminated polymers are high temperatures, no comonomer, no transfer agents, and a non-solution process or a dispersion using an alkane diluent. Increase of temperature during polymerization is also said to yield β-hydride eliminated product, for example while adding ethylene so as to form an ethylene "end cap". This document goes on to describe a large class of both mono-cyclopentadienyl and bis-cyclopentadienyl metallocenes as suitable in accordance with the invention when activated by either alumoxanes or ionizing compounds providing stabilizing, noncoordinating anions. The examples all illustrate the use of the Lewis acid activator tris(perfluorophenyl) boron with bis (cyclopentadienyl) zirconium dimethyl at a polymerization temperature of 90° C. Copolymerization was conducted with ethylene and the two macromers, respectively, using the same catalyst systems as used to form the macromers.

Additional art addresses the preparation of chain-end unsaturated polymers with various metallocenes under various conditions, each of vinyl-, vinylidene-, vinylene- and trisubstituted-unsaturation resulting from the reported processes. The difficulty in determining by standard characterization methods ($^1$H-NM or $^{13}$C-NMR) the total of saturated chain ends has resulted in acceptance in the art of characterizing unsaturated end-group by the fraction of the total of each type of unsaturation to the total unsaturated ends. However, industrially efficient methods of production would greatly benefit from high unsaturated end group concentrations to the total end group population, that is including the saturated ends. Thus, the reported variations in molecular weight distributions and the inability to accurately determine or predict the resulting type of chain ends, or the less favored production of unsaturated chain-ends other than those of vinyl, limits the utility of the prior art.

Vinyl-chain ends are generally accepted to be more reactive to chain-end functionalization and insertion in subsequent polymerization reactions than are the other types and are more highly preferred. Therefore, polypropylene macromers with a high percentage of vinyl terminal bonds would be desirable for use in the preparation of branched polymers. In addition, stereospecific polypropylene (i.e. isotactic and/or syndiotactic polypropylene) is more desirable than atactic polypropylene. Stereospecific polypropylene has a more crystalline structure which imparts greater strength properties to the polymer. Accordingly, a need still exists for polypropylene macromers which are stereospecific to impart strength and have a high percentage of vinyl terminal bonds for improved utility in the preparation of branched polymers.

SUMMARY OF THE INVENTION

The present invention meets that need by providing a method for producing stereospecific polypropylene macromers having a high percentage of vinyl groups. These stereospecific polypropylene chains have number average molecular weights ($M_n$) of about 2,000 Daltons to about 50,000 Daltons, and the total number of vinyl groups per 1000 carbon atoms is greater than or equal to $7000 \div M_n$.

The method for preparing polymers having a high percentage of vinyl terminal bonds involves:

a) contacting, in solution, at a temperature from about 90° C. to about 120° C., two or more propylene monomers with a catalyst composition containing a chiral, stereorigid transition metal catalyst compound; and b) recovering stereospecific polypropylene chains having number average molecular weights of about 2,000 Daltons to about 50,000 Daltons and significant vinyl unsaturation.

The polypropylene macromers of the present invention are novel, at least in part, in that they are stereospecific, imparting improved strength characteristics, and have a high percentage of vinyl terminal bonds for improved utility in the preparation of branched polymers.

DETAILED DESCRIPTION OF THE INVENTION

The present invention involves forming polypropylene chains which can be used for a variety of purposes such as addition reactions and further insertion polymerization where the vinyl-terminated polymers are copolymerized with other monomers such as α-olefins and/or other insertion polymerizable monomers. These chains will be described in this application as macromonomers or macromers. The polypropylene macromers of the present invention are stereospecific and have a high percentage of vinyl terminated end groups.

Unlike polyethylene macromer which can be made with high vinyl end-group selectivity, vinyl terminated polypropylenes are rare, especially isotactic polypropylenes. While regular β-H elimination gives vinyl terminal bonds in polyethylene, it requires β-methyl elimination to give vinyl terminal bonds in polypropylene. Atactic vinyl terminated polypropylene has been produced by Resconi, et al using a $(C_5Me_5)_2MX_2$ catalyst (M=Zr and Hf, X=halides). It is possible that the steric congestion created by the bulky pentamethylpentadienyl ligands favors β-methyl elimination as opposed to β-H elimination which, in turn, gives high vinyl end-group selectivity (86–98%). However, the polypropylene macromers produced using this method have low molecular weight and are atactic. The polypropylene macromers of the present invention, on the other hand, are stereospecific and have relatively high molecular weights.

The polypropylene macromers of the present invention are the polymeric chain reaction products of insertion or coordination polymerization of propylene monomers. High proportions of vinyl containing chains relative to the total number of unsaturated chains in the polymerization reaction products were effectively achieved. These levels reached greater than 75% vinyl containing chains. The polypropylene macromers contain chains with narrow polydispersities, from about 1.6 to about 3.2, typically 1.8 to 2.6, or even 1.9 to 2.3.

The total number of vinyl groups per 1000 carbon atoms of the polypropylene macromers is typically greater than or equal to $7000 \div M_n$. Preferably, the total number of vinyl groups per 1000 carbon atoms is greater than or equal to $8500 \div M_n$. More preferably, the total number of vinyl groups per 1000 carbon atoms is greater than or equal to $10000 \div M_n$.

The percentage of terminally unsaturated stereospecific polypropylene chains in the product of the present invention may be 75% of the total stereospecific polypropylene chains produced or higher. The percentage of terminally unsaturated stereospecific polypropylene chains may be as high as 90 or even 95%.

The stereospecific polypropylene macromers of the present invention may be isotactic polypropylene, syndiotactic polypropylene, or a mixture thereof.

As used herein, "isotactic polypropylene" is defined as polypropylene having at least 70% isotactic pentads according to analysis by $^{13}C$-NMR. "Syndiotactic polypropylene" is defined as polypropylene having at least 70% syndiotactic pentads according to analysis by $^{13}C$-NMR. "Highly isotactic polypropylene" is defined as polypropylene having at least 90% isotactic pentads according to analysis by $^{13}C$-NMR. Preferably, the macromers of the present invention are highly isotactic polypropylene.

The number-average molecular weight ($M_n$) of the polypropylene macromers of the present invention typically ranges from greater than or equal to 2,000 Daltons to less than about 50,000 Daltons, preferably less than 40,000 Daltons, more preferably less than 30,000 Daltons, most preferably less than or equal to 20,000 Daltons. Preferably, the $M_n$ of the polypropylene macromers of the present invention is greater than or equal to 5,000 Daltons, more preferably greater than or equal to 7,500 Daltons, most preferably greater than or equal to 10,000 Daltons.

The polypropylene macromers thus described exhibit high numbers of vinyl containing chains for the total polymeric reaction product, including both polymer chains having saturated groups and those with unsaturated groups. Preferably, at least 50 percent of the stereospecific polypropylene macromers have vinyl terminal bonds. More preferably, at least 60 percent of the stereospecific polypropylene macromers have vinyl terminal bonds. Most preferably, at least 70 percent of the stereospecific polypropylene macromers have vinyl terminal bonds. Accordingly, these macromers can be effectively used for subsequent reactions where reactive vinyl groups are needed.

Preferably, the ratio of vinyl groups to total olefin groups in the polypropylene macromers is greater than or equal to 0.60. This is represented by the following formula:

$$\frac{\text{vinyl groups}}{\text{olefin groups}} \geq 0.60$$

More preferably, the ratio of vinyl groups to total olefin groups is greater than or equal to 0.75.

The method for preparing the stereospecific polypropylene vinyl-containing macromers of the present invention involves contacting propylene monomers with a catalyst solution composition containing a transition metal catalyst compound and, preferably, an activator compound. More preferably, the activator is alumoxane. The catalyst solution preparation typically comprises contacting an alumoxane activator with a transition metal compound in a suitable solvent so as to form a solution of activated catalyst. Suitable solvents are those which are capable of solvating to a significant extent both the activator and the transition metal compound, as can be readily determined empirically. Both aliphatic and aromatic solvents will be suitable so long as the transition metal compound and the alumoxane activator are substantially soluble at the mixing temperatures utilized. Toluene is a preferred solvent for the catalyst solution due to the high solubility of alumoxane in toluene. In addition, many transition metal compounds are soluble in toluene.

The method of preparation for the polymeric vinyl-containing macromer product of the invention depends upon several factors. An important factor is the temperature used for the polymerization. Temperature is important because it has a significant effect on the $M_n$ of the macromers produced. Generally, lower temperatures result in macromers with higher molecular weights. For the present invention, temperatures in the range of from about 90° C. to about 120° C. are preferred. More preferably, the temperature ranges from about 95° C. to about 115° C., even more preferably from 100° C. to 110° C. Most preferred are temperatures in the range of 105° C. to 110° C.

The pressure and time of reaction depend upon the selected process but are generally within the normal ranges for the selected process. The pressures of the reaction generally can vary from atmospheric to $305 \times 10^3$ kPa, preferably to 182×10³ kPa. For typical solution reactions, pressures can range from ambient to 3450 kPa. The reactions can be run batchwise. Conditions for slurry-type reactions are similar to solution conditions except reaction temperatures are limited to the melt temperature of the polymer. In some reaction configurations, a supercritical fluid medium can be used with temperatures up to 250° C. and pressures up to 345×10³ kPa. Under high temperature reaction conditions, macromer product of lower molecular weight ranges are typically produced.

Batchwise reaction times can vary from 1 minute to 10 hours, more preferably 5 minutes to 6 hours, and most typically from 15 minutes to 60 minutes. The reactions can also be run continuously. In continuous processes the average residence times can similarly vary from 1 minute to 10 hours, more preferably 5 minutes to 6 hours, and most typically from 15 minutes to 60 minutes.

Catalysts which are useful for producing the macromer product of the present invention include all catalysts which are capable of producing stereospecific polypropylene. Preferably, metallocene catalysts are used.

As used herein "metallocene" refers generally to compounds represented by the formula $Cp_mMR_nX_q$ wherein Cp is a cyclopentadienyl ring which may be substituted, or derivative thereof which may be substituted, M is a Group 4, 5, or 6 transition metal, for example titanium, zirconium, hafnium, vanadium, niobium, tantalum, chromium, molybdenum and tungsten, R is a hydrocarbyl group or hydrocarboxy group having from one to 20 carbon atoms, X is a halogen, and m=1–3, n=0–3, q=0–3, and the sum of m+n+q is equal to the oxidation state of the transition metal.

Methods for making and using metallocenes are well known in the art. For example, metallocenes are detailed in U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,278,119; 5,304,614; 5,324,800; 5,350,723; and 5,391,790 each fully incorporated herein by reference.

Preferred metallocenes are those that are stereorigid and comprise a Group 4, 5, or 6 transition metal, biscyclopentadienyl derivative, preferably bis-indenyl metallocene components having the following general structure:

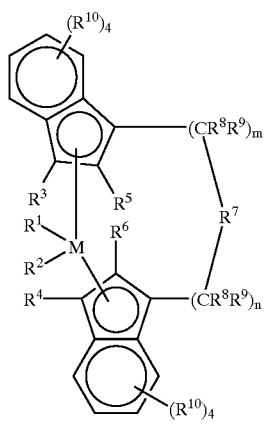

wherein $M^1$ is a metal of Group 4, 5, or 6 of the Periodic Table, for example titanium, zirconium, hafnium, vanadium, niobium, tantalum, chromium, molybdenum and tungsten, preferably, zirconium, hafnium and titanium, most preferably zirconium and hafnium;

$R^1$ and $R^2$ are identical or different, are one of a hydrogen atom, a $C_1$–$C_{10}$ alkyl group, preferably a $C_1$–$C_3$ alkyl group, a $C_1$–$C_{10}$ alkoxy group, preferably a $C_1$–$C_3$ alkoxy group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, or a halogen atom, preferably chlorine;

$R^3$ and $R^4$ are hydrogen atoms;

$R^5$ and $R^6$ are identical or different, preferably identical, are one of a hydrogen atom, halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$-arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_8$ aryl group;

$R^7$ is

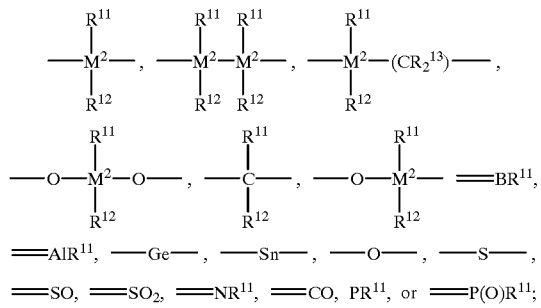

wherein:

$R^{11}$, $R^{12}$ and $R^{13}$ are identical or different and are a hydrogen atom, a halogen atom, a $C_1$–$C_{20}$ alkyl group, preferably a $C_1$–$C_{10}$ alkyl group, a $C_1$–$C_{20}$ fluoroalkyl group, preferably a $C_1$–$C_{10}$ fluoroalkyl group, a $C_6$–$C_{30}$ aryl group, preferably a $C_6$–$C_{20}$ aryl group, a $C_6$–$C_{30}$ fluoroaryl group, preferably a $C_6$–$C_{20}$ fluoroaryl group, a $C_1$–$C_{20}$ alkoxy group, preferably a $C_1$–$C_{10}$ alkoxy group, a $C_2$–$C_{20}$ alkenyl group, preferably a $C_2$–$C_{10}$ alkenyl group, a $C_7$–$C_{40}$ arylalkyl group, preferably a $C_7$–$C_{20}$ arylalkyl group, a $C_8$–$C_{40}$ arylalkenyl group, preferably a $C_8$–$C_{22}$ arylalkenyl group, a $C_7$–$C_{40}$ alkylaryl group, preferably a $C_7$–$C_{20}$ alkylaryl group or $R^{11}$ and $R^{12}$, or $R^{11}$ and $R^{13}$, together with the atoms binding them, can form ring systems;

$M^2$ is silicon, germanium or tin, preferably silicon or germanium, most preferably silicon;

$R^8$ and $R^9$ are identical or different and have the meanings stated for $R^{11}$;

m and n are identical or different and are zero, 1 or 2, preferably zero or 1, m plus n being zero, 1 or 2, preferably zero or 1; and the radicals $R^{10}$ are identical or different and have the meanings stated for $R^{11}$, $R^{12}$ and $R^{13}$. Two adjacent $R^{10}$ radicals can be joined together to form a ring system, preferably a ring system containing from about 4–6 carbon atoms.

Alkyl refers to straight or branched chain substituents. Halogen (halogenated) is fluorine, chlorine, bromine or iodine atoms, preferably fluorine or chlorine.

Preferred transition metal catalysts are chiral and stereorigid. Particularly preferred metallocenes are compounds of the structures:

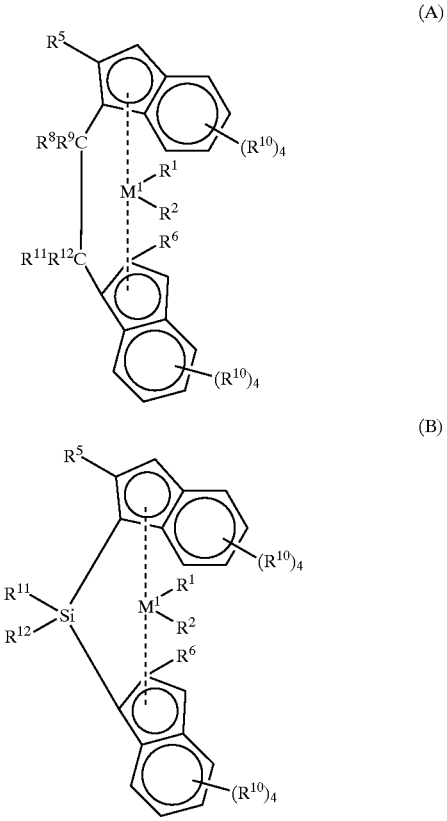

wherein:

$M^1$ Is Zr or Hf, $R^1$ and $R^2$ are methyl or chlorine, and $R^5$, $R^6$, $R^8$, $R^9$, $R^{10}$, $R^{11}$ and $R^{12}$ have the above-mentioned meanings.

Most preferably, the catalysts used to produce the isotactic polypropylene macromers of the present invention are dimethylsilyl-bridged bis-indenyl zirconocenes or hafnocenes such as dimethylsilyl bis(tetrahydroindenyl) zirconium dichloride, dimethylsilyl bis(indenyl)hafnium dimethyl, dimethylsilyl bis(2-methylindenyl)zirconium dichloride, and dimethylsilyl bis(2-methyl-4-phenylindenyl) zirconium dichloride.

Most preferably, the catalysts used to produce the syndiotactic polypropylene macromers of the present invention are those disclosed in U.S. Pat. Nos. 4,892,851, 5,155,080, and 5,132,381, the disclosures of which are hereby incorporated by reference.

The terms "cocatalyst" and "activator" are used herein interchangeably and are defined to be any compound or component which can activate a bulky ligand transition metal compound or a metallocene, as defined above. Alumoxane may be used as an activator. There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594–218 and WO 94/10180, each of which is fully incorporated herein by reference. It may be preferable to use a visually clear methylalumoxane. A cloudy or gelled alumoxane can be filtered to produce a clear solution or clear alumoxane can be decanted from the cloudy solution.

It is also within the scope of this invention to use ionizing activators, neutral or ionic, or compounds such as tri(n-butyl)ammonium tetrakis(pentaflurophenyl)boron, which ionize the neutral metallocene compound. Such ionizing compounds may contain an active proton, or some other cation associated with but not coordinated or only loosely coordinated to the remaining ion of the ionizing compound. Combinations of activators are also contemplated by the invention, for example, alumoxane and ionizing activators in combinations, see for example, WO 94/07928.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333 (incorporated herein by reference). These teach a preferred method of preparation wherein metallocenes (bisCp and monoCp) are protonated by an anion precursor such that an alkyl/hydride group is abstracted from a transition metal to make it both cationic and charge-balanced by the non-coordinating anion.

The term "noncoordinating anion" means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization.

The use of ionizing ionic compounds not containing an active proton but capable of producing the both the active metallocene cation and an noncoordinating anion is also known. See, EP-A-0 426 637 and EP-A-0 573 403 (incorporated herein by reference). An additional method of making the ionic catalysts uses ionizing anion pre-cursors which are initially neutral Lewis acids but form the cation and anion upon ionizing reaction with the metallocene compounds, for example the use of tris(pentafluorophenyl) boron. See EP-A-0 520 732 (incorporated herein by reference). Ionic catalysts for addition polymerization can also be prepared by oxidation of the metal centers of transition metal compounds by anion pre-cursors containing metallic oxidizing groups along with the anion groups, see EP-A-0 495 375 (incorporated herein by reference).

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944 and EP-A1-0 570 982 (incorporated herein by reference) for in situ processes describing the reaction of alkyl aluminum compounds with dihalo-substituted metallocene compounds prior to or with the addition of activating anionic compounds.

Useful activator compounds include organometallic compounds containing metals of Group 1, 2, 12 and 13 of the periodic table. Preferred activator compounds include alumoxanes such as methylalumoxane (MAO) and non-coordinating anion precursors such as dimethylanilinium tetrakis(perfluoroaryl)borate [DMAH]$^+$[(C$_6$F$_5$)$_4$B]$^-$.

Preferred combinations of catalyst and activator include dimethylsilyl bis(indenyl)hafnium dimethyl with [DMAH]$^+$. [(C$_6$F$_5$)$_4$B]$^-$ and dimethylsilyl bis(2-methyl-4-phenylindenyl) zirconium dichloride with MAO. Most preferably, the catalyst/activator system is and dimethylsilyl bis(2-methyl-4-phenylindenyl) zirconium dichloride with MAO.

When an alkyl alumoxane activator is used, the molar ratio of aluminum in the alkyl alumoxane activator to transition metal can be considered. Preferably that level is $\geq$20 and $\leq$175; more preferably $\geq$20 and $\leq$140; and, most preferably $\geq$20 and $\leq$100.

The metallocenes described herein are preferably supported using a porous particulate material, such as for example, talc, inorganic oxides, inorganic chlorides and resinous materials such as polyolefin or polymeric compounds.

The most preferred support materials are porous inorganic oxide materials, which include those from the Periodic Table of Elements of Groups 2, 3, 4, 5, 13 or 14 metal oxides. Silica, alumina, silica-alumina, and mixtures thereof are particularly preferred. Other inorganic oxides that may be employed either alone or in combination with the silica, alumina or silica-alumina are magnesia, titania, zirconia, and the like.

Preferably the support material is porous silica which has a surface area in the range of from about 10 to about 700 m$^2$/g, a total pore volume in the range of from about 0.1 to about 4.0 cc/g and an average particle size in the range of from about 10 to about 500 $\mu$m. More preferably, the surface area is in the range of from about 50 to about 500 m$^2$/g, the pore volume is in the range of from about 0.5 to about 3.5 cc/g and the average particle size is in the range of from about 20 to about 200 $\mu$m. Most preferably the surface area is in the range of from about 100 to about 400 m$^2$/g, the pore volume is in the range of from about 0.8 to about 3.0 cc/g and the average particle size is in the range of from about 30 to about 100 $\mu$m. The average pore size of typical porous support materials is in the range of from about 10 to about 1000 Å. Preferably, a support material is used that has an average pore diameter of from about 50 to about 500 Å, and most preferably from about 75 to about 350 Å. It may be particularly desirable to dehydrate the silica at a temperature of from about 100° C. to about 80° C. anywhere from about 3 to about 24 hours.

The metallocenes, activator and support material may be combined in any number of ways. Suitable support techniques are described in U.S. Pat. Nos. 4,808,561 and 4,701,432 (each fully incorporated herein by reference.). Preferably the metallocenes and activator are combined and their reaction product supported on the porous support material as described in U.S. Pat. No. 5,240,894 and WO 94/28034, WO 96/00243, and WO 96/00245 (each filly incorporated herein by reference.) Alternatively, the metallocenes may be pre-activated separately and then combined with the support material either separately or together. If the metallocenes are separately supported, then preferably, they are dried then combined as a powder before use in polymerization.

Regardless of whether the metallocene and activator are separately precontacted or whether the metallocene and activator are combined at once, the total volume of reaction solution applied to porous support is preferably less than about 4 times the total pore volume of the porous support, more preferably less than about 3 times the total pore volume of the porous support and even more preferably in the range of from more than about 1 to less than about 2.5 times the total pore volume of the porous support. Procedures for measuring the total pore volume of porous support are well known in the art. The preferred method is described in Volume 1, *Experimental Methods in Catalyst Research*, Academic Press, 1968, pages 67–96.

Methods of supporting ionic catalysts comprising metallocene cations and noncoordinating anions are described in WO 91/09882, WO 94/03506, WO 96/04319 and U.S. Pat. No. 5,643,847 (incorporated herein by reference). The methods generally comprise either physical adsorption on traditional polymeric or inorganic supports that have been largely dehydrated and dehydroxylated, or using neutral anion precursors that are sufficiently strong Lewis acids to activate retained hydroxy groups in silica containing inorganic oxide supports such that the Lewis acid becomes covalently bound and the hydrogen of the hydroxy group is available to protonate the metallocene compounds.

The supported catalyst system may be used directly in polymerization or the catalyst system may be prepolymerized using methods well known in the art. For details regarding prepolymerization, see U.S. Pat. No. 4,923,833 and 4,921,825, EP 0 279 863 and EP 0 354 893 each of which is fully incorporated herein by reference.

Reactor configurations suitable for the present invention include continuous, batch and semi-batch reactors. Solution-phase, gas-phase, slurry-phase, and supercritical-phase conditions are useful for olefin polymerization using these catalysts. Additionally, combinations of the above reactor types in multiple, series reactors and/or multiple reaction conditions and/or multiple catalyst configurations are explicitly intended.

Preferably, the macromers of the present invention are made using solution-phase conditions. Preferred solvents for solution phase reactions are selected on the basis of polymer solubility, volatility and safety/health considerations. Non-polar alkanes or aromatics are preferred. More preferably, the solvent is aromatic. Most preferably, the solvent is toluene.

For supercritical fluid reactions, the reaction medium is generally composed of polymer, monomer, and comonomer with, optionally, suitable supercritical cosolvents. For slurry reactions the diluent may be an inert liquid or bulk liquid comonomer. Solvents, cosolvents and comonomers are typically purified by treatment with absorbent material including aluminas and molecular sieves. Impurities can also be deactivated by the addition of suitable scavengers well known in the art, including but not limited to metal alkyls and alumoxanes.

INDUSTRIAL UTILITY

Branched polymers wherein at least some of the branches are derived from the vinyl macromer-containing product of the invention will be particularly useful, for example, for improved processing propylene copolymers having macromer derived branches. Also, the stereospecific polypropylene macromers of the present invention may provide improved strength and melting point characteristics to propylene copolymers in which they are incorporated. Vinyl macromer incorporation for branched polymer preparation can be accomplished by adding the invention polymer product into an insertion polymerization environment with a catalyst compound capable of bulky monomer incorporation. Also, it will be apparent to one of ordinary skill in the art that the vinyl macromer-containing product of the present invention can be used as insertion macromers in any other olefin polymerization reactions.

Selection of metallocene compounds for use to make isotactic or syndiotactic polypropylene, and their syntheses, are well-known in the art, specific reference may be made to both patent literature and academic, see for example Journal of Organometallic Chemistry 369, 359–370 (1989). Typically those catalysts are stereorigid asymmetric, chiral or bridged chiral metallocenes. See, for example, U.S. Pat. No. 4,892,851, U.S. Pat. No. 5,017,714, U.S. Pat. No. 5,132,381, U.S. Pat. No. 5,155,080, U.S. Pat. No. 5,296,434, U.S. Pat. No. 5,278,264, WO-A-(PCT/US92/10066) WO-A-93/19103, EP-A2-0 577 581, EP-A1-0 578 838, and academic literature "The Influence of Aromatic Substituents on the Polymerization Behavior of Bridged Zirconocene Catalysts", Spaleck, W., et al, *Organometallics* 1994, 13, 954–963, and "ansa-Zirconocene Polymerization Catalysts with Annelated Ring Ligands-Effects on Catalytic Activity and Polymer Chain Lengths", Brinzinger, H., et al, *Organometallics* 1994, 13, 964–970, and documents referred to therein. Though many above are directed to catalyst systems with alumoxane activators, the analogous metallocene compounds will be useful with non-coordinating anion activators for active coordination catalyst systems, when at least one of the halogen containing ligands of the metals (where occurring) are replaced with ligands capable of protonation, for example, via an alkylation reaction as described above, and another is a group into which the ethene group —C=C— may insert, for example, hydride, alkyl, or even the less effective silyl. Also, WO 94/07930, addressed in the background, describes the advantages of macromer incorporation and means of doing so. Each of these documents is also incorporated by reference for purposes of U.S. patent practice.

For both vinyl macromer product and branched copolymer preparation, it is known that many methods and permutations of the ordering of addition of macromer and monomer species to the reactor are possible, some more advantageous than others. For example, it is widely known in the art that preactivation of the metallocene with alumoxane before addition to a continuous solution-phase reactor yields higher activities than continuous addition of metallocene and activator in two separate streams. Furthermore, it may be advantageous to control precontacting time to maximize catalyst effectiveness, e.g., avoiding excessive aging of the activated catalyst composition.

Preferred branch copolymers of the invention are propylene homopolymers and copolymers of propylene with two or more comonomers. The most readily available comonomers are the olefins, especially ethylene, 1-butene, isobutylene, 1-hexene, and 1-octene. Other suitable comonomers shall include but not be limited to: internal olefins, cyclic olefins, substituted olefins, multiply substituted olefins and aromatic olefins, such as those described above for the vinyl macromer products. Comonomers are selected for use based on the desired properties of the polymer product and the metallocene employed will be selected for its ability to incorporate the desired amount of olefins.

Functionalization reactions for low molecular weight vinyl group-containing polymeric products include those based on thermal or free radical addition, or grafting, of vinyl-group containing compounds and ethylenically unsaturated compounds. A typical, industrially useful example is subsequent grafting reactions with maleic acid, maleic anhydride or vinyl acids or acid esters, e.g., acrylic acid, methyl acrylate, etc. The addition of these groups allows for additional functionalization through amidation, immidization, esterification and the like.

It is preferable to use the high vinyl-unsaturation polymeric products of the invention such that they are promptly functionalized or copolymerized after prepared. The highly reactive vinyl groups appear to be susceptible to by-product reactions with adventitious impurities and, even, dimerization or addition reactions with other unsaturated group-containing polymeric chains. Thus maintaining in a cooled, inert environment after preparation and prompt subsequent use will optimize the effectiveness of the use of vinyl macromer product of the invention. A continuous process utilizing series reactors, or parallel reactors will thus be effective, the vinyl macromer product being prepared in one and continuously introduced into the other.

In order that the invention may be more readily understood, reference is made to the following examples, which are intended to illustrate the invention but not to limit the scope thereof.

EXAMPLES

General

All polymerizations were performed in a 2-liter Zipperclave reactor equipped with a water jacket for temperature control. Liquids were measured into the reactor using calibrated sight glasses. High purity (>99.5%) toluene was purified by passing first through basic alumina activated at high temperature in nitrogen, followed by molecular sieve activated at high temperature in nitrogen. Propylene was purified by passing through activated basic alumina and molecular sieves. Methylalumoxane (MAO, 10% in toluene) was received from Albemarle Inc. in stainless steel cylinders, divided into 1-liter glass containers, and stored in a laboratory glove-box at ambient temperature. Dimethylanilinium tetrakis(perfluoroaryl)borate [DMAH]$^+$ [(C$_6$F$_5$)$_4$B]$^-$ was obtained from Boulder Scientific Co., Mead, Colo.

Propylene was measured into the reactor through a calibrated container. To ensure the reaction medium was well-mixed, a flat-paddle stirrer rotating at 750 rpm was used.

Reactor Preparation

The reactor was first cleaned by heating to 150° C. in toluene to dissolve any polymer residues, then cooled and drained. Next, the reactor was heated using jacket water at 110° C. and the reactor was purged with flowing nitrogen for a period of 30 minutes. Before reaction, the reactor was further purged using 3 nitrogen pressurize/vent cycles (to 100 psi). The cycling served two purposes: (1) to thoroughly penetrate all dead ends such as pressure gauges to purge fugitive contaminants and (2) to pressure test the reactor.

Catalysts

All catalyst preparations were performed in an inert atmosphere with <1.5 ppm H$_2$O content. The catalyst systems used in the synthesis of macromer were dimethylsilyl bis(indenyl)hafnium dimethyl and dimethylsilyl bis(2-methyl-4-phenylindenyl) zirconium dichloride. The dimethylsilyl bis(indenyl)hafnium dimethyl was activated with [DMAH]$^+$ [(C$_6$F$_5$)$_4$B]$^-$ and the dimethylsilyl bis(2-methyl-4-phenylindenyl) zirconium dichloride was activated with MAO. To maximize solubility of the metallocenes, toluene was used as a solvent. The catalyst as added to a stainless steel tube by pipette and transferred to the reactor.

EXAMPLE 1

The synthesis was conducted in a 2-liter autoclave reactor. The reactor was charged with toluene (300 mL), propylene (75 mL), and triisobutylaluminum (2.0 mL of 1M solution in toluene). The reactor was heated to 120° C. and equilibrated for 5 min. Then 2 mg of dimethylsilyl bis(indenyl)hafnium dimethyl and 3 mg of [DMAH]$^+$ [(C$_6$F$_5$)$_4$B]$^-$ in 5 mL of toluene were injected using a catalyst tube. After 10 min, the reactor was cooled to 25° C. and vented. Solvent was evaporated. The polymer was collected and dried in a vacuum oven for 12 hours. Yield: 18 g.

EXAMPLE 2

A 2-liter autoclave reactor was charged with toluene (300 mL), propylene (75 mL), and triisobutylaluminum (2.0 mL of 1M solution in toluene). The reactor was heated to 105° C. and equilibrated for 5 min. Then 3.5 mg of dimethylsilyl bis(indenyl)hafnium dimethyl and 4.5 mg of [DMAH]$^+$ [(C$_6$F$_5$)$_4$B]$^-$ in 5 mL of toluene were injected using a catalyst tube. After 10 min, the reactor was cooled to 25° C. and vented. Methanol (500 mL) was added to the polymer solution to precipitate the polymer. The polymer was collected by filtration, washed with acetone (50 mL), and dried in a vacuum oven for 12 hours. Yield: 23 g.

EXAMPLE 3

A 2-liter autoclave reactor was charged with toluene (300 mL), propylene (150 mL), and triisobutylaluminum (2.0 mL of 1M solution in toluene). The reactor was heated to 105° C. and equilibrated for 5 min. Then 2 mg of dimethylsilyl bis(indenyl)hafnium dimethyl and 3 mg of [DMAH]$^+$ [(C$_6$F$_5$)$_4$B]$^-$ in 5 mL of toluene were injected using a catalyst tube. After 15 min, the reactor was cooled to 25° C. and vented. Methanol (1 L) was added to the polymer solution to precipitate the polymer. The polymer was collected by filtration, washed with acetone (100 mL), and dried in a vacuum oven for 12 hours. Yield: 53 g.

EXAMPLE 4

A 2-liter autoclave reactor was charged with toluene (1 L), propylene (150 mL), and triisobutylaluminum (2.0 mL of 1M solution in toluene). The reactor was heated to 95° C. and equilibrated for 5 min. Then 2 mg of dimethylsilyl bis(2-methyl-4-phenylindenyl) zirconium dichloride and 1 mL of MAO (10 wt. % in toluene) were injected using a catalyst tube. After 10 min, the reactor was cooled to 25° C. and vented. Methanol (500 mL) was added to the polymer solution to precipitate the polymer. The polymer was collected by filtration, and dried in a vacuum oven for 12 hours. Yield: 67 g.

EXAMPLE 5

A 2-liter autoclave reactor was charged with toluene (1 L), propylene (150 mL), and triisobutylaluminum (2.0 mL of 1M solution in toluene). The reactor was heated to 105° C. and equilibrated for 5 min. Then 2 mg of dimethylsilyl bis(2-methyl-4-phenylindenyl) zirconium dichloride and 1 mL of MAO (10 wt. % in toluene) were injected using a catalyst tube. After 15 min, the reactor was cooled to 25° C. and vented. Methanol (500 mL) was added to the polymer solution to precipitate the polymer. The polymer was collected by filtration, and dried in a vacuum oven for 12 hours. Yield: 58 g.

EXAMPLE 6

The synthesis was conducted in a 2-liter autoclave reactor. The reactor was charged with toluene (1 L), propylene (150 mL), and triisobutylaluminum (2.0 mL of 1M solution in toluene). The reactor was heated to 75° C. and equilibrated for 5 min. Then 2 mg of dimethylsilyl bis(2-methyl-4-phenylindenyl) zirconium dichloride and 1 mL of MAO (10 wt. % in toluene) were injected using a catalyst tube. After 15 min, the reactor was cooled to 25° C. and vented. Solvent was evaporated. The polymer was collected filtration, washed with acetone (50 mL), and dried in a vacuum oven for 12 hours. Yield: 76 g.

COMPARATIVE EXAMPLE 7

The synthesis was conducted in a 2-liter autoclave reactor. The reactor was charged with toluene (1 L), propylene (150 mL), and triisobutylaluminum (1.0 mL of 1M solution in toluene). The reactor was heated to 50° C. and equilibrated for 5 min. Then 3 mg of dimethylsilyl bis(indenyl)hafnium dimethyl and 3 mg of [DMAH]$^+$ [(C$_6$F$_5$)$_4$B]$^-$ in 5 mL of toluene were injected using a catalyst tube. After 10 min, the reactor was cooled to 25° C. and vented. Solvent was evaporated. The polymer was collected and dried in a vacuum oven for 12 hours. Yield: 23 g.

COMPARATIVE EXAMPLE 8

The synthesis was conducted in a 2-liter autoclave reactor. The reactor was charged with toluene (1 L), propylene (150 mL), and triisobutylaluminum (2.0 mL of 1M solution in toluene). The reactor was heated to 50° C. and equilibrated for 5 min. Then 2 mg of dimethylsilyl bis(2-methyl-4-phenylindenyl) zirconium dichloride and 1 mL of MAO (10 wt. % in toluene) were injected using a catalyst tube. After 30 min, the reactor was cooled to 25° C. and vented. Solvent was evaporated. The polymer was collected filtration, washed with acetone (50 mL), and dried in a vacuum oven for 12 hours. Yield: 70 g.

EXAMPLE 9

Polypropylene macromer was produced in a 5 gallon stirred tank reactor. The reactor was charged with toluene (15.15 liters), propylene (2.27 liters), and Triisobutylaluminum (30 mL of 1M solution in toluene). The reactor was heated to 105° C. and equilibrated for 5 min. Then 60 mg of dimethylsilyl bis(2-methyl-4-phenylindenyl) zirconium dichloride activated in 50 mL of toluene and 15 mL of MAO (10 wt % in toluene) was injected using a catalyst tube. After 30 min, the reactor was cooled to 25° C. and vented. The content was transferred to a steam stripper where the solvent was stripped out under vacuum. The polymer was collected and dried in a vacuum oven for 12 hours. Yield: 716 g. Vinyl terminal group: 80.5%. Mn: 17,100. Tm: 145° C.

Product Characterization

The polymer product samples were analyzed by gel permeation chromatography using a Waters 150C high temperature system equipped with a DRI Detector, Showdex AT-806MS column and operating at a system temperature of 145° C. The solvent used was 1,2,4-trichlorobenzene, from which polymer sample solutions of 1.5 mg/ml concentration were prepared for injection. The total solvent flow rate was 1 ml/minute and the injection size was 300 microliters. After elution of the polymer samples, the resulting chromatograms were analyzed using the Waters Expert Fuse program to calculate the molecular weight distribution and one or more of $M_n$, $M_w$ and $M_z$ averages. The melting point of the polymer product samples was determined on a DSC 2910 Differential Scanning Calorimeter (TA Instruments). The reported melting points were recorded at second melt with a temperature ramp of 2–10° C./min.

$^1$H-NMR analyses were performed using a 500 mHz Varian Unity model operating at 120° C. using tetrachloroethene as solvent. $^{13}$C-NMR analyses were performed using at 100 mHz frequency, a Varian Unity Plus model under the same conditions.

TABLE 1

GPC Molecular Weight and Number Summary

| Example | Mn | Mw | MWD |
|---|---|---|---|
| 1 | 3,377 | 6,530 | 1.93 |
| 2 | 6,732 | 16,394 | 2.43 |
| 3 | 14,856 | 29,747 | 2.00 |
| 4 | 30,688 | 65,341 | 2.13 |
| 5 | 20,133 | 44,066 | 2.33 |
| 6 | 54,236 | 108,377 | 2.00 |
| Comp. 7 | 162,824 | 306,393 | 1.88 |
| Comp. 8 | 81,782 | 144,474 | 1.77 |

TABLE 2

Melting Point Summary

| Example | Tm (° C.) |
|---|---|
| 1 | 57.0 |
| 2 | 103.0 |
| 3 | 112.0 |
| 4 | 151.8 |
| 5 | 152.3 |
| 6 | 155.0 |
| Comp. 7 | 137.0 |
| Comp. 8 | 149.8 |

TABLE 3

NMR Polymer Analyses Summary

| Example | Vinylidene/ 1000 C. | Vinyl/ 1000 C. | Trisubst/ 1000 C. | Vinylene/ 1000 C. | % vinyl | Mn |
|---|---|---|---|---|---|---|
| 1 | 1.30 | 3.82 | 0.20 | 0.07 | 71.0 | 2,600 |
| 2 | 0.72 | 1.66 | 0.11 | 0.04 | 66.0 | 5,500 |
| 3 | 0.34 | 0.62 | 0.10 | 0.03 | 57.0 | 12,800 |
| 4 | 0.01 | 0.47 | 0.06 | 0.02 | 72.3 | 21,500 |
| 5 | 0.13 | 0.73 | 0.04 | 0.02 | 79.4 | 15,200 |
| 6 | 0.06 | 0.18 | 0 | 0 | 75.0 | 58,000 |
| Comp. 7 | 0.08 | 0.04 | 0.02 | 0.01 | 26.7 | 94,000 |
| Comp. 8 | 0.14 | 0.02 | 0.01 | 0 | 11.8 | 82,400 |

Polymer Analyses

The molecular weight, molecular number and molecular weight distribution of the reaction products are reported in Table 1. The melting points of the reaction products are reported in Table 2. The NMR data related to unsaturated-group structural distributions of the reaction products are reported in Table 3. The reaction products of Comparative Examples 7 and 8, which were polymerized at 50° C., have significantly higher $M_n$ values and significantly lower vinyl percentages than the other reaction products.

While certain representative embodiments and details have been shown for the purposes of illustrating the invention, it will be apparent to those skilled in the art that various changes in the process and products disclosed herein may be made without departing from the scope of the invention, which is defined in the appended claims.

We claim:

1. A composition of matter comprising isotactic polypropylene chains having vinyl groups wherein the number average molecular weights ($M_n$) of said isotactic polypropylene chains are about 2,000 Daltons to about 50,000 Daltons and further, wherein the total number of vinyl groups per 1000 carbon atoms is greater than or equal to $7000 \div M_n$.

2. The composition of claim 1 wherein the total number of vinyl groups per 1000 carbon atoms is greater than or equal to $8500 \div M_n$.

3. The composition of claim 1 wherein the total number of vinyl groups per 1000 carbon atoms is greater than or equal to $10000 \div M_n$.

4. The composition of claim 1 wherein said isotactic polypropylene chains have number average molecular weights of from about 5,000 Daltons to about 40,000 Daltons.

5. The composition of claim 1 wherein said isotactic polypropylene chains have number average molecular weights of from about 7,500 Daltons to about 30,000 Daltons.

6. The composition of claim 1 wherein said isotactic polypropylene chains have number average molecular weights of from about 10,000 Daltons to about 20,000 Daltons.

7. The composition of claim 1 wherein the ratio of vinyl groups to total olefin groups is greater than or equal to 0.60.

8. A method for preparing polymers having a high percentage of vinyl terminal bonds comprising:

a) contacting, in solution, at a temperature from about 90° C. to about 120° C., two or more propylene monomers with a catalyst composition comprising a chiral, stereorigid transition metal catalyst compound capable of producing isotactic polypropylene; and b) recovering isotactic polypropylene chains having number average molecular weights of about 2,000 Daltons to about 50,000 Daltons.

9. The method of claim 8 wherein said propylene monomers are contacted at a temperature from 95° C. to 115° C.

10. The method of claim 9 wherein said propylene monomers are contacted at a temperature from 100° C. to 110° C.

11. The method of claim 10 wherein said propylene monomers are contacted at a temperature from 105° C. to 110° C.

12. The method of claim 8 wherein said catalyst composition further comprises a non-coordinating anion precursor.

13. The method of claim 8 wherein said catalyst composition further comprises an alumoxane.

14. The method of claim 8 wherein said chiral, stereorigid transition metal catalyst compound is selected from the group consisting of dimethylsilyl-bridged bis-indenyl zirconocenes or hafnocenes.

15. The method of claim 13 herein said transition metal catalyst compound is a dimethylsilyl-bridged bis-indenyl zirconocene.

16. The method of claim 13 wherein said transition metal catalyst compound is dimethylsilyl bis(2-methyl-4-phenylindenyl) zirconium dichloride.

17. The method of claim 12 wherein said transition metal catalyst compound is a dimethylsilyl-bridged bis-indenyl hafnocene.

18. The method of claim 12 wherein said transition metal catalyst compound is dimethylsilyl bis(indenyl)hafnium dimethyl.

19. The method of claim 8 wherein said isotactic polypropylene chains have number average molecular weights of from about 7,500 Daltons to about 30,000 Daltons.

20. The method of claim 8 wherein said isotactic polypropylene chains have number average molecular weights of from about 10,000 Daltons to about 20,000 Daltons.

* * * * *